US012312859B2

(12) United States Patent
Fisher et al.

(10) Patent No.: US 12,312,859 B2
(45) Date of Patent: May 27, 2025

(54) SLIDING GLASS DOOR WEDGE

(71) Applicant: STORM ARMOUR, INC., Miami Beach, FL (US)

(72) Inventors: Mark Fisher, Bal Harbour, FL (US); Todd Michael Glaser, Miami Beach, FL (US); Ronald Simkins, Miami, FL (US); David Kreps, Miami Beach, FL (US); Werner Blumenthal, Miami, FL (US)

(73) Assignee: STORM ARMOUR, INC., Miami Beach, FL (US)

(*) Notice: Subject to any disclaimer, the term of this patent is extended or adjusted under 35 U.S.C. 154(b) by 154 days.

(21) Appl. No.: 17/994,231

(22) Filed: Nov. 25, 2022

(65) Prior Publication Data

US 2023/0087436 A1 Mar. 23, 2023

Related U.S. Application Data

(63) Continuation-in-part of application No. 17/428,113, filed as application No. PCT/US2021/012414 on Jan. 7, 2021.

(51) Int. Cl.

| | |
|---|---|
| ***E06B 7/26*** | (2006.01) |
| ***E06B 3/46*** | (2006.01) |
| ***E06B 7/18*** | (2006.01) |

(52) U.S. Cl.

CPC .............. *E06B 7/26* (2013.01); *E06B 3/4636* (2013.01); *E06B 7/18* (2013.01)

(58) Field of Classification Search

CPC ............. E06B 7/26; E06B 7/18; E06B 3/4636

See application file for complete search history.

(56) References Cited

U.S. PATENT DOCUMENTS

| | | | | |
|---|---|---|---|---|
| 4,232,081 | A * | 11/1980 | Pullan | B60J 10/27 52/312 |
| 4,692,961 | A * | 9/1987 | Brown | E06B 9/00 49/476.1 |
| 5,495,884 | A * | 3/1996 | Shikler | B60J 1/208 248/205.5 |
| 9,080,375 | B2 * | 7/2015 | Fleeting | E06B 7/26 |
| 10,428,578 | B1 * | 10/2019 | Glaser | E06B 9/00 |
| 10,920,483 | B2 * | 2/2021 | Mutchnik | E06B 1/702 |
| 2023/0160255 | A1 * | 5/2023 | Fisher | F16B 47/00 52/97 |

FOREIGN PATENT DOCUMENTS

| | | | |
|---|---|---|---|
| WO | WO-2022150038 A1 * | 7/2022 | E06B 7/26 |

* cited by examiner

*Primary Examiner* — Mark R Wendell

(74) *Attorney, Agent, or Firm* — Taylor English Duma LLP

(57) ABSTRACT

A rain deflector apparatus provides a declined body surface to deflect water away from a sliding glass door (or similar structure) and a one or more compliant portion in order to prevent water and debris from collecting in the track and making its way under the door. In a preferred embodiment, the rain deflector apparatus is secured to the door or door track by a one or more attachment mechanism. The attachment mechanism(s) is/are selected such that their holding force to the track or other structure is sufficient to keep the upper edge of the apparatus pressed up against the glass and the lower edge in sealed relation to the track or floor.

17 Claims, 13 Drawing Sheets

1000

SLIDING GLASS DOOR WEDGE

CROSS-REFERENCE TO RELATED APPLICATIONS

This application is a continuation application of co-pending U.S. patent application Ser. No. 17/428,113, filed on Aug. 3, 2021, which was submitted under 35 U.S.C. 371 as a U.S. National Stage Entry of pending PCT/US21/12414, filed on Jan. 7, 2021, all of which are incorporated by reference herein in their entireties.

FIELD OF THE INVENTION

The present invention generally relates to rain deflectors and more specifically, to an apparatus and system for an improved sliding glass door rain deflector to deflect wind-driven rain and prevent flooding under a sliding glass door.

BACKGROUND OF THE INVENTION

In high rise condominiums, townhouses, apartment buildings, and private residences there are no current practical and/or efficient ways to reduce the amount of water intrusion through sliding glass doors during severe weather. Hurricane rated or not, most sliding glass doors are built with weep holes, which allow water that has accumulated to drain out, but not in high wind conditions. Under these severe conditions, weep holes do not function properly. Currently, there are no practical methods to reduce water intrusion. Current offerings are difficult to install and/or are hard to store. Implementation and deployment of current methods is difficult.

It is a known issue with sliding glass doors that, due to the nature of their design to run in a track, water can accumulate within the track. Although sliding door tracks are generally designed with weep holes to allow water to drain out to the exterior of the structure, in adverse conditions the weep holes may become obstructed with debris thereby permitting the track to fill with water, seep under the sliding door and into the interior of the structure. In other scenarios, such as in a heavy storm, rainwater may be driven under the sliding glass door panel by forceful winds.

It is not always possible to design a structure where the sliding glass door is under a sufficient overhang to avoid rain and wind effects. In other situations, it is not convenient, nor advisable, to utilize known water diversion means, such as sandbags, since even a minor hole or tear in the sandbag could fill the track with sand—resulting in an undesirable mess within the track. Another detriment to using sandbags is that the sliding glass door can now no longer be opened from the inside without destroying the protections provided by the sandbags. Furthermore, in high-rise situations, where the sliding glass door leads to a closed balcony, it is impossible, or at best impractical, to sandbag the sliding glass door, and then get back into the dwelling.

It is also known in the art to use a wedge-like device to prevent flooding under sliding patio doors by blocking the space between a bottom of a sliding door panel and the top of the sliding door track, as is disclosed in commonly-owned U.S. Pat. No. 10,428,578 for "Device for preventing flooding in sliding patio doors." However, this solution requires the use of a heavy material that is shapeable so that the weight of the device itself creates a sealing surface to the track and prevents the device from being blown away in strong winds.

It would be advantageous, then, to have a device that provides the advantages of deflecting water from accumulating in the track of a sliding glass door, while also being lightweight and easy to use. It would also be advantageous to have such a device that also permits the sliding glass door to be opened and closed without having to go outside or remove the device. Additionally, it would be advantageous to have a device of this sort that further does not employ sandbags or similar heavy, yet pliable, means that could damage the smooth functioning of the track.

There is a need, therefore, for a lightweight, compact mechanical device that provides a physical barrier, which diverts water and wind away from the track of a sliding glass door during severe weather.

SUMMARY OF THE INVENTION

We disclose a lightweight, compact mechanical device that provides a physical barrier, which diverts water and wind away from the track of a sliding glass door during severe weather. The apparatus disclosed is a compact, reusable device that reduces water intrusion during severe weather conditions and includes improvements to the apparatus and system disclosed in commonly owned and co-pending U.S. patent application Ser. No. 17/428,113.

As discussed above, commonly-owned U.S. Pat. No. 10,428,578 for "Device for preventing flooding in sliding patio doors," discloses a wedge-like device to prevent flooding under sliding patio doors by blocking the space between a bottom of a sliding door panel and the top of the sliding door track. We disclose here an improvement to the device disclosed in U.S. Pat. No. 10,428,578 that is lightweight, easy to use, and does not employ sandbags or similar bagged particulate to achieve a conforming seal.

We disclose a rain deflector apparatus that provides a declined body surface to deflect water away from a sliding glass door (or similar structure) and a compliant base portion that can be secured to the sliding glass door's track in order to prevent water and debris from collecting in the track and making its way under the door. Alternatively, the apparatus can be installed such that it is attached directly to the glass and a compliant base portion is positioned on the floor, or adjacent surface, just outside of the track. In a preferred embodiment, the rain deflector has a main body that is a substantially flat sheet having a front face, a back face, and a thickness defining a top edge, a bottom edge, a right edge, and a left edge. In embodiments, the thickness may vary from the top edge to the bottom edge. A bottom seal portion extends from the bottom edge, spanning substantially from the right edge to the left edge and, preferably, the entire length of the main body. A top sealing surface portion is disposed adjacent to the top edge, spanning substantially from the right edge to the left edge and, preferably, the entire length of the main body. Finally, a one or more attach mechanism is disposed in spaced relation on the back face distal to the top sealing surface portion, near the bottom edge at a desired distance from the bottom seal portion.

Further embodiments of the invention include one or more rain deflector apparatus used as part of a system useful for the deflection of rain water in a sliding glass door or similar structure. Other embodiments of a rain deflector system further includes structures configured to provide additional rain water intrusion mitigation installed on the inside of the glass doors or similar structures.

An object of the invention is to provide a rain deflector apparatus that is easy to install and remove on a sliding glass door or similar structure.

Another object of the invention is to provide a rain deflector apparatus that is sufficiently rigid so as to maintain its shape and rain deflecting characteristics, but also compliant enough so that it can be pressed up against adjacent installation surfaces and, when secured in place, provides a sealing force, pressing the rain deflector onto the adjacent installation surfaces.

Another object of the invention is to provide a rain deflector apparatus that is at least partially pliable, meaning compliant, so that a sliding glass door panel adjacent to which it is installed on its exterior, is able to be opened and closed without removing the rain deflector apparatus.

Yet another object of the invention is to provide one or more rain deflector apparatus as part of a system for deflecting rain from a sliding glass door, or similar structure.

Other features that are considered as characteristic for the invention are set forth in the drawings and preferred embodiment.

Although the invention is illustrated and described herein as embodied in a device for preventing flooding through a sliding patio door, the invention should not be limited to the details shown in those embodiments because various modifications and structural changes may be made without departing from the spirit and scope of the invention. Furthermore, while the invention is described within the context of a sliding glass door, one of ordinary skill in the art will realize that the invention may be sized and configured as appropriate for other applications such as windows and other similar structures.

The construction and method of operation of the invention and additional objects and advantages of the invention are best understood from the following description of specific embodiments when read in connection with the accompanying drawings.

BRIEF DESCRIPTION OF THE DRAWINGS

In the accompanying figures, like reference numerals refer to identical or functionally similar elements throughout the separate views. The accompanying figures, together with the detailed description below, are incorporated in and form part of the specification and serve to further illustrate various embodiments and to explain various principles and advantages all in accordance with the present invention, in which.

Figure 1:
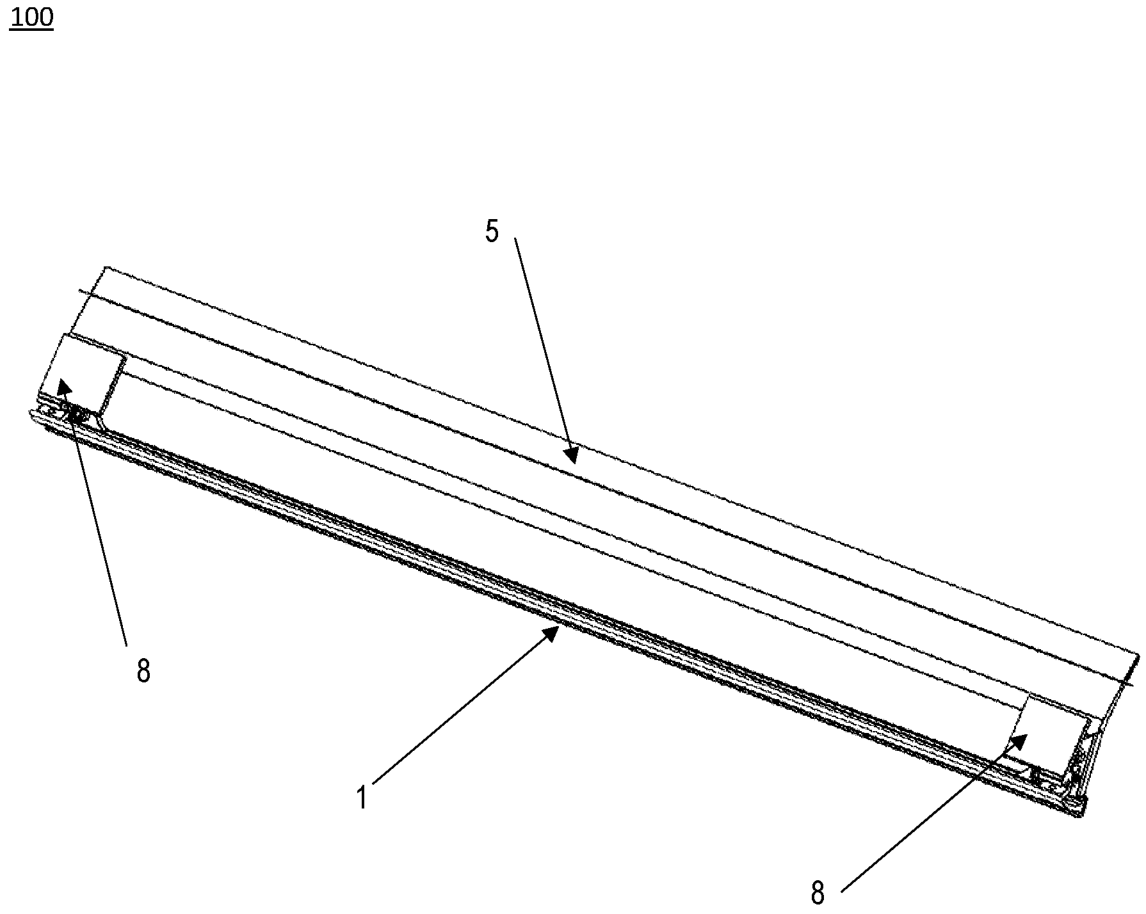
FIG. 1 shows an isometric back view according to an embodiment of the present invention.
Figure 2:
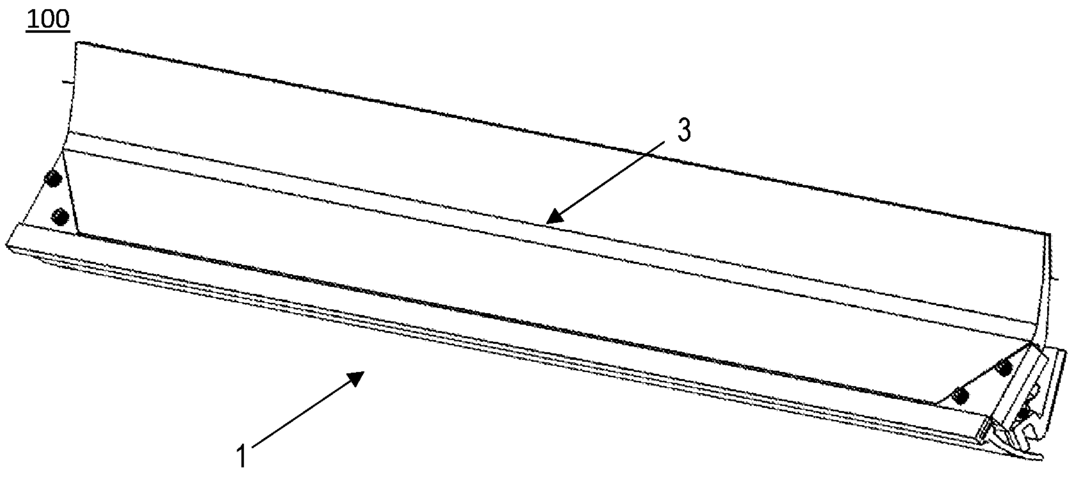
FIG. 2 shows an isometric front view of the invention shown in FIG. 1.
Figure 3:
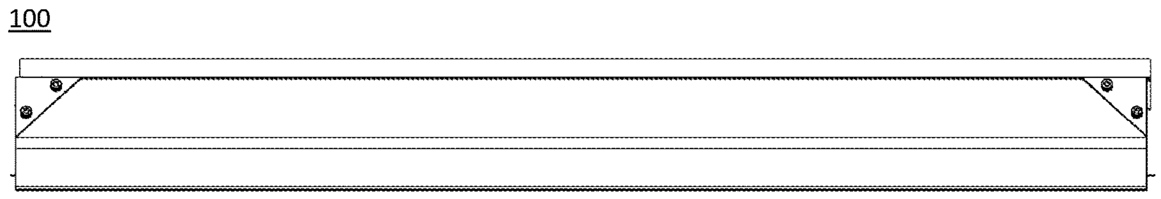
FIG. 3 shows a top view of the invention shown in FIG. 1.
Figure 4:
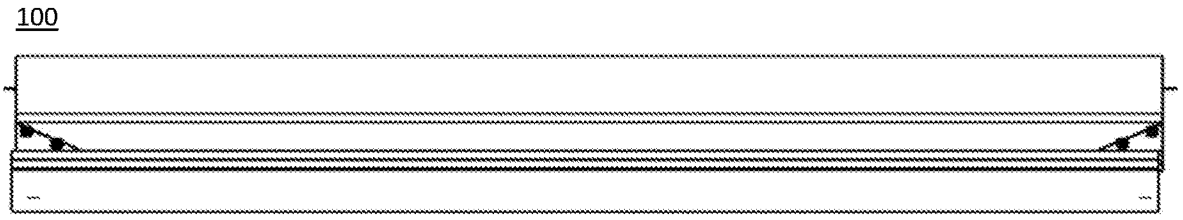
FIG. 4 shows a front view of the invention shown in FIG. 1.

For compactness of disclosure, the various figures depict embodiments of the rain deflector where the upper portion of the rain deflector is shown in a curved, or bent, state. This state is shown since this is the form that the apparatus will take once installed and the top portion is bent, or deflected, by the static forces imparted onto the apparatus once installed. A person skilled in the art would recognize that, absent the forces imparted via installation, the rain deflector apparatus may be substantially flat, as depicted by the dotted line segment of FIG. 5.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

In this specification and in the appended claims and drawings, words and phrases have the meanings commonly attributed to them in the relevant art except as otherwise specified herein. The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein. While certain aspects of conventional technologies and methods in the relevant art have been discussed to facilitate disclosure of the invention, Applicant in no way disclaims these technical aspects or methods, and it is contemplated that the claimed invention may encompass one or more of the conventional technical aspects or methods discussed herein.

Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. Specifically, component names, types, and values, as depicted in the exemplary schematic diagrams, are not intended to limit the scope of the present invention and are presented only as possible embodiments.

We disclose an inventive rain deflector that is an improvement over the prior art and adds novel features to the invention disclosed in commonly owned and co-pending U.S. patent application Ser. No. 17/428,113. The inventive rain deflector may be used singly, or in combination with multiple panels as needed to correspond to the number of glass panels in the sliding glass door, window, or other similar structure. Throughout this disclosure, we may also refer to the inventive rain deflector as a static deflector or a mobile deflector. This nomenclature corresponds with multi-panel sliding glass doors where, for example, one door slides (mobile) while the other door is stationary (static). In other sliding glass door systems there may be multiple "mobile" doors and this disclosure contemplates all of those varied combinations.

Also, throughout the present disclosure, the word "seal," and grammatical equivalents thereof, is used to express the mating of a non-rigid, or semi-rigid, structure to a rigid structure. The object of the current invention is to deflect as much water as possible from the track of the sliding glass door, but, especially in storms with high winds, it may not be possible to create a perfect seal to keep all of the water out. In embodiments, this "seal" may be achieved through the use of a mechanical structure such as, but not limited, to an adhesive. In other embodiments, the "seal" is achieved by virtue of the geometry and structural relationship between various components of the invention that, in conjunction, "press" structures together to form the "seal".

Referring now to the figures in general, and FIGS. 1-8 in particular, we disclose a preferred embodiment of a rain deflector 100, according to the invention. Rain deflector 100 is comprised of a substantially flat main body 3, having a front, back, and four edges. Bottom seal 1 is configured to be sealably engaged within, or to a surface adjacent to, a sliding glass door track once installed on a sliding glass door that rides in the track.

Figure 5:
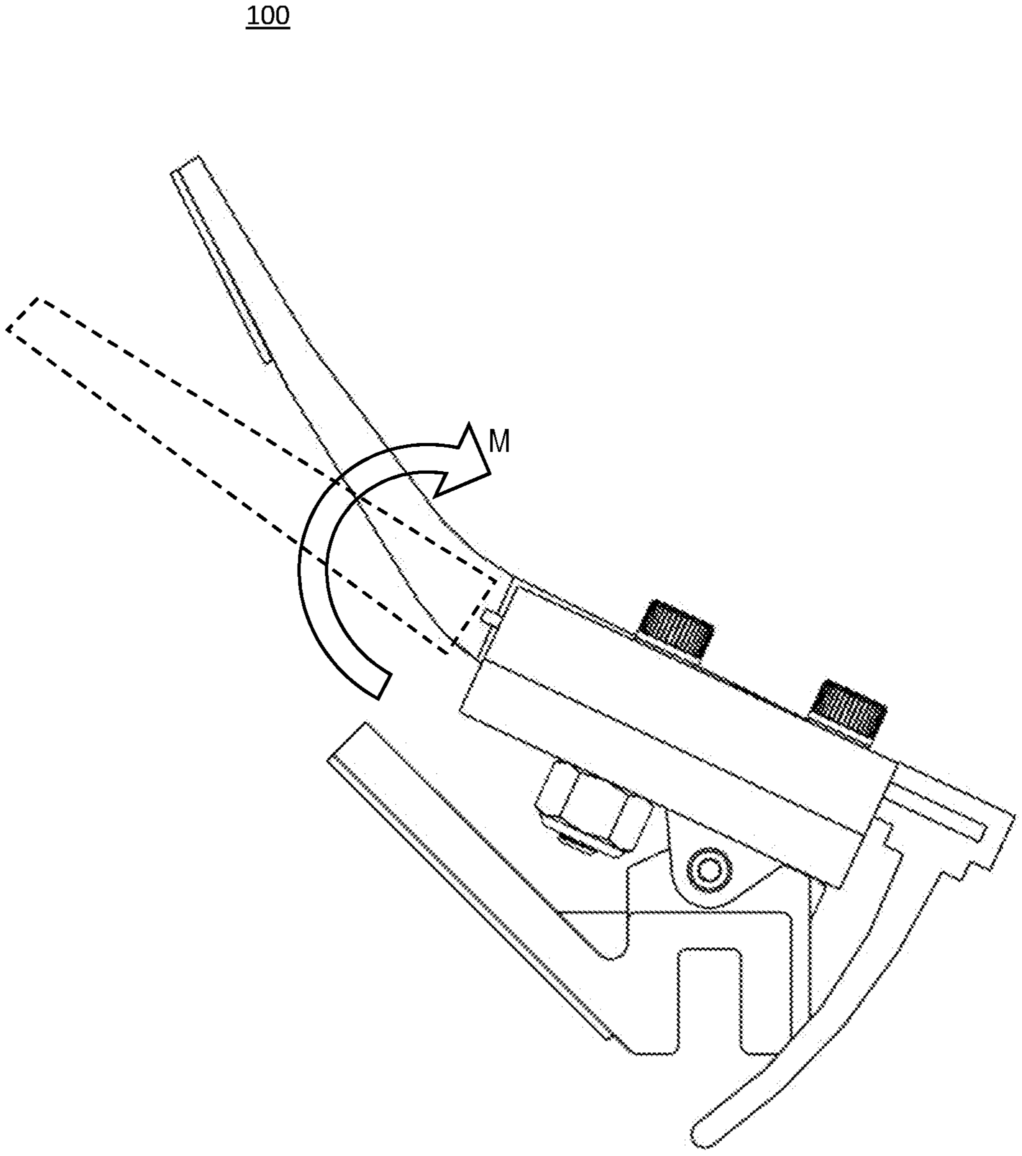
FIG. 5 shows a right view of the invention shown in FIG. 1.
Figure 6:
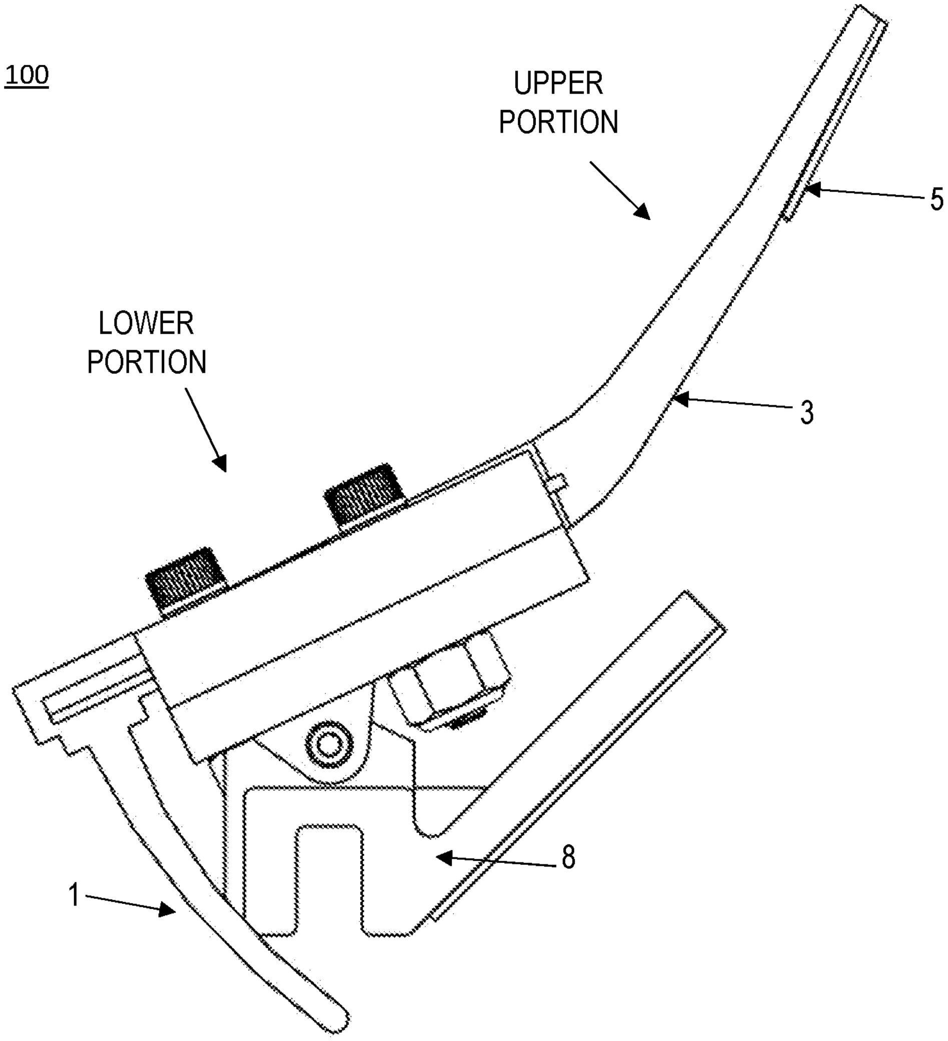
FIG. 6 shows a left view of the invention shown in FIG. 1.
Figure 7:
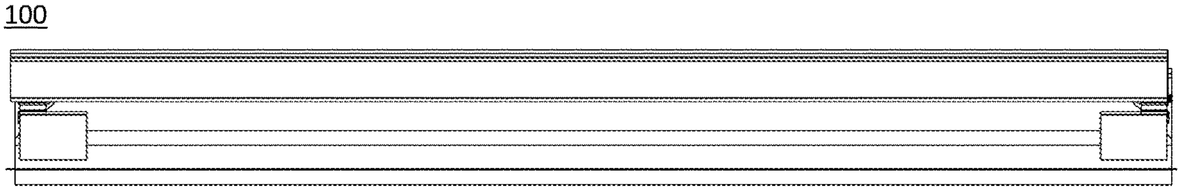
FIG. 7 shows a bottom view of the invention shown in FIG. 1.
Figure 8:
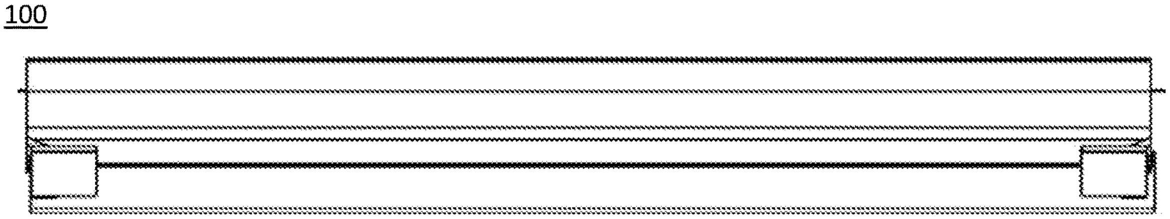
FIG. 8 shows a back view of the invention shown in FIG. 1.
Figure 9:
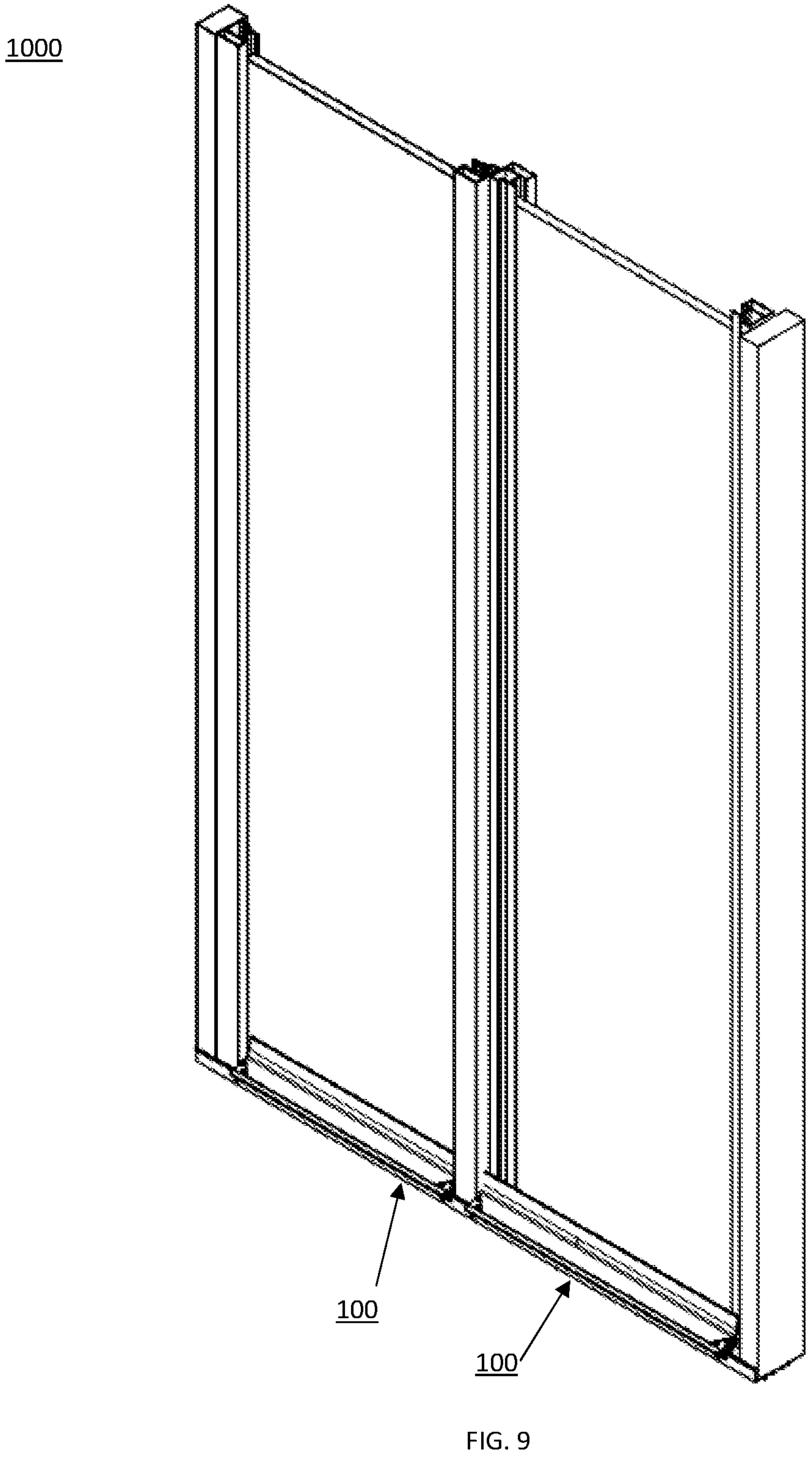
FIG. 9 shows an isometric view of a system embodiment of the invention in the closed state.
Figure 10:
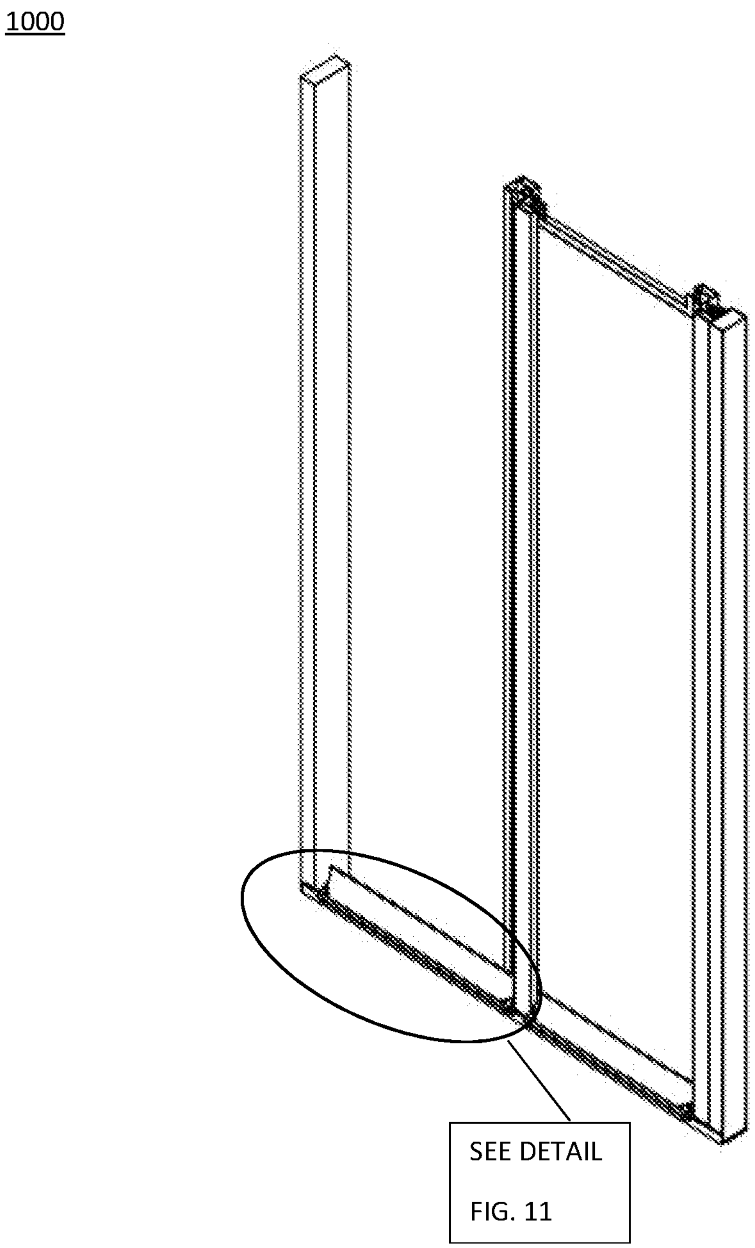
FIG. 10 shows an isometric view of a system embodiment of the invention shown in FIG. 9 in the open state.
Figure 11:
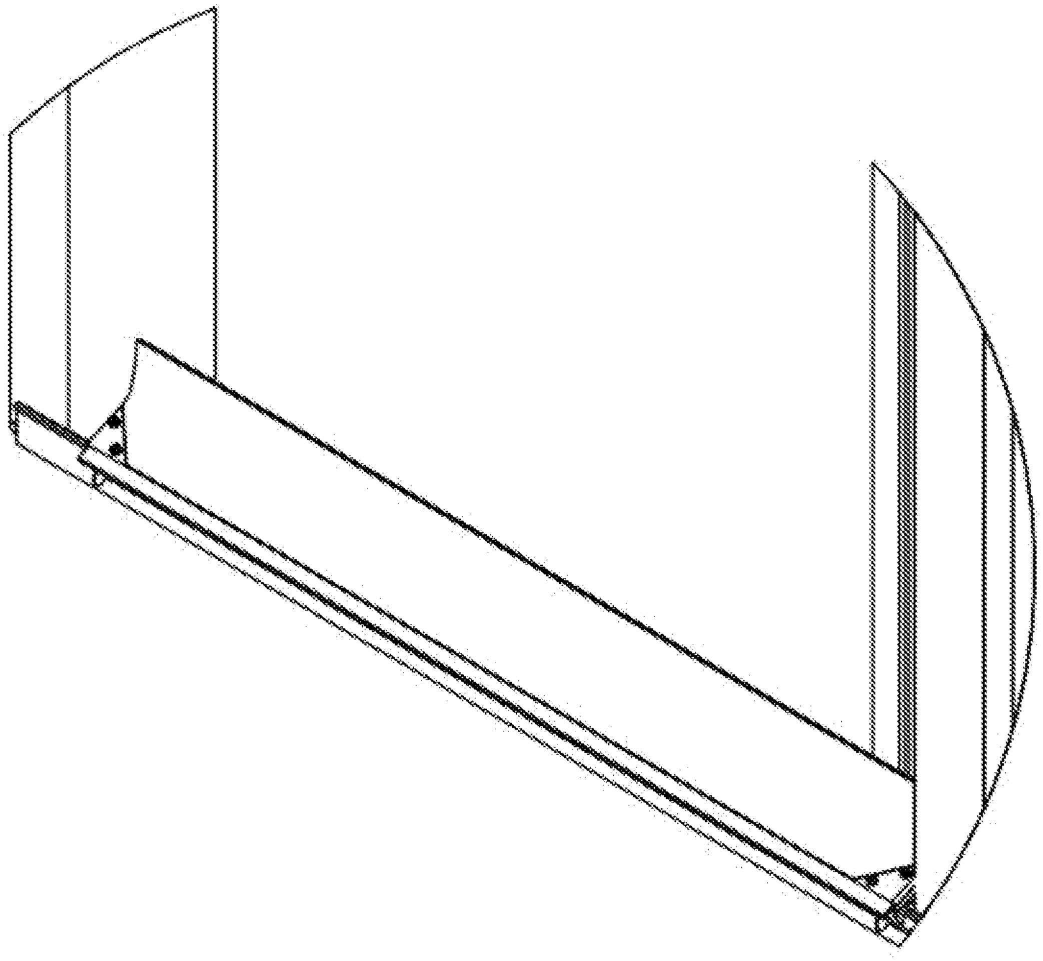
FIG. 11 shows a detail view of FIG. 10.
Figure 12:
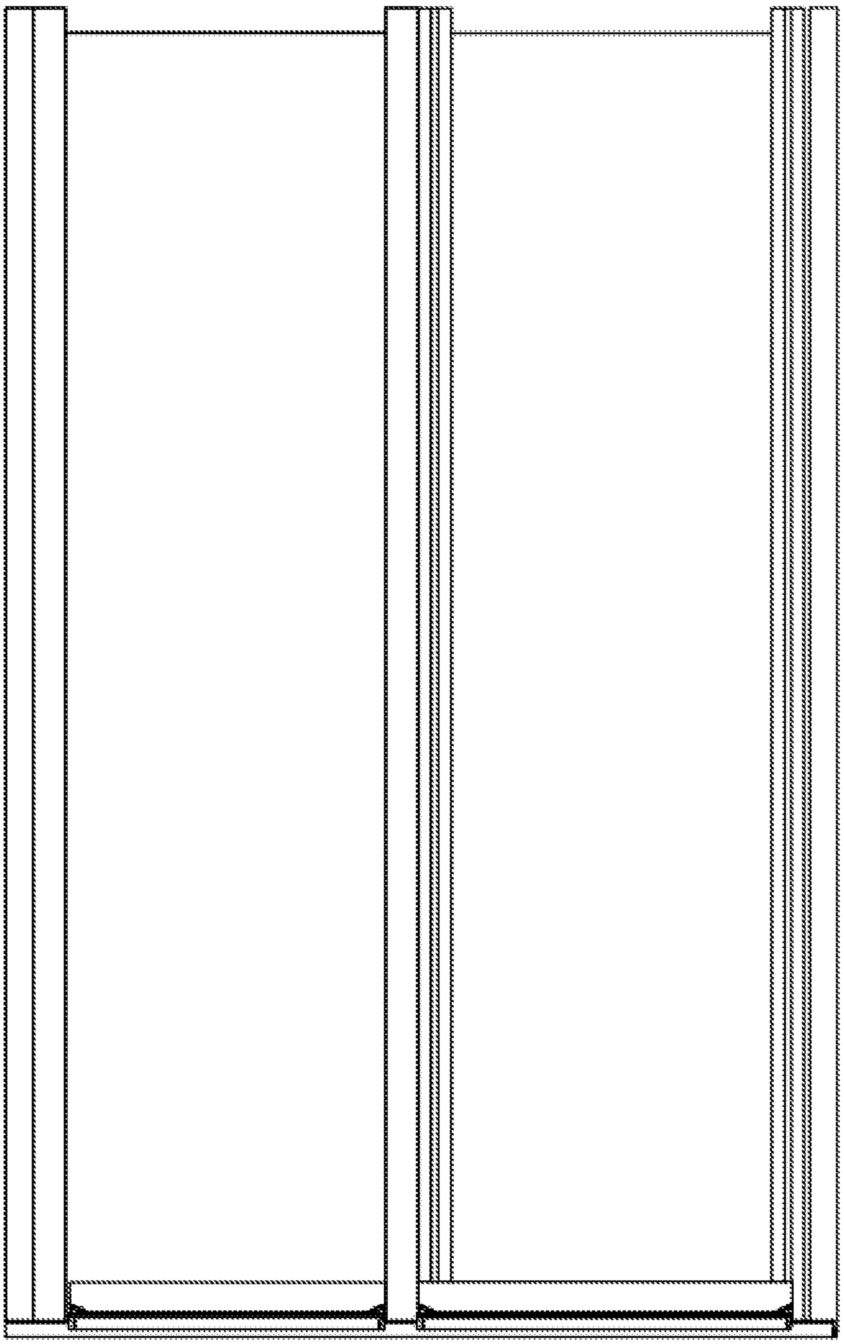
FIG. 12 shows a front view of a system embodiment of the invention shown in FIG. 9 in the closed state.
Figure 13:
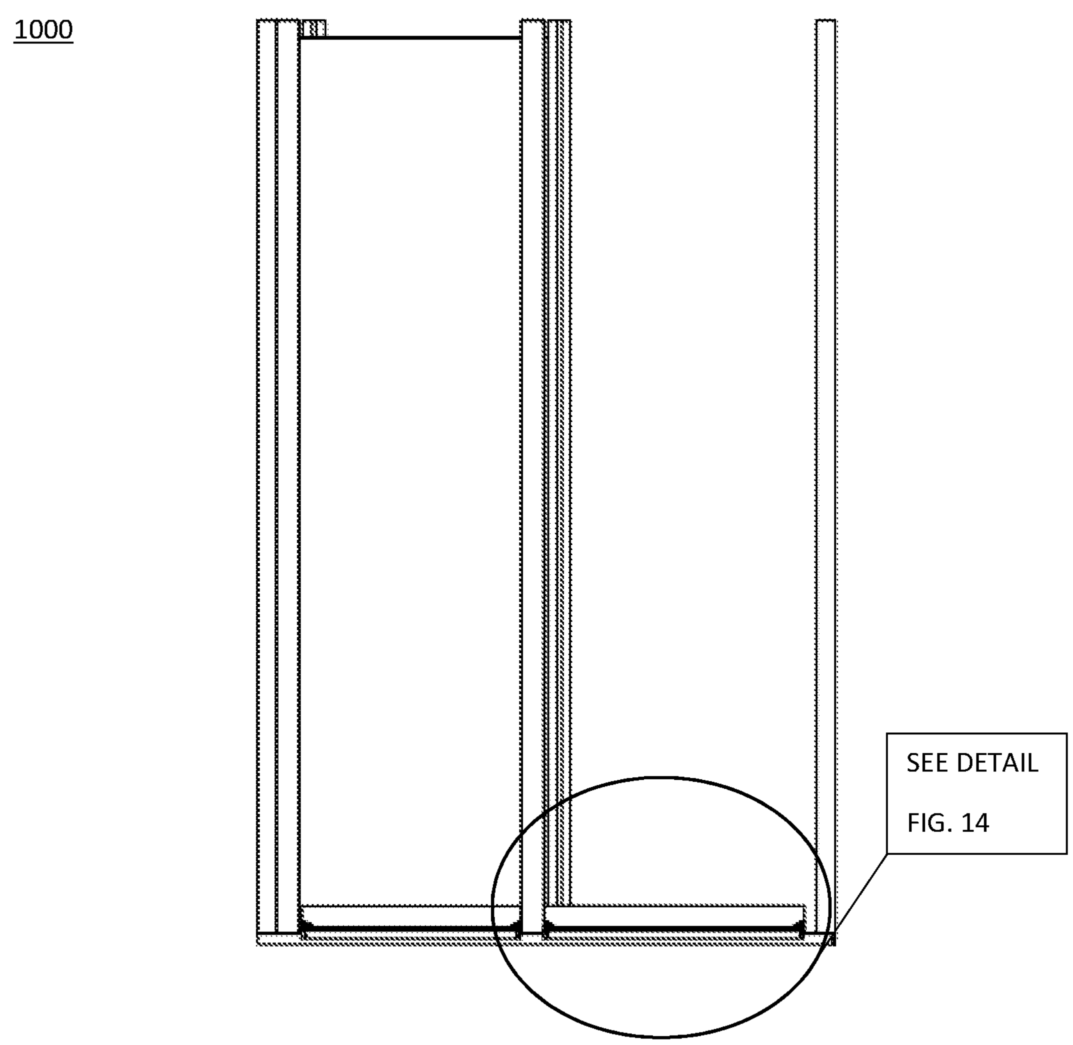
FIG. 13 shows a front view of a system embodiment of the invention shown in FIG. 9 in the open state.
Figure 14:
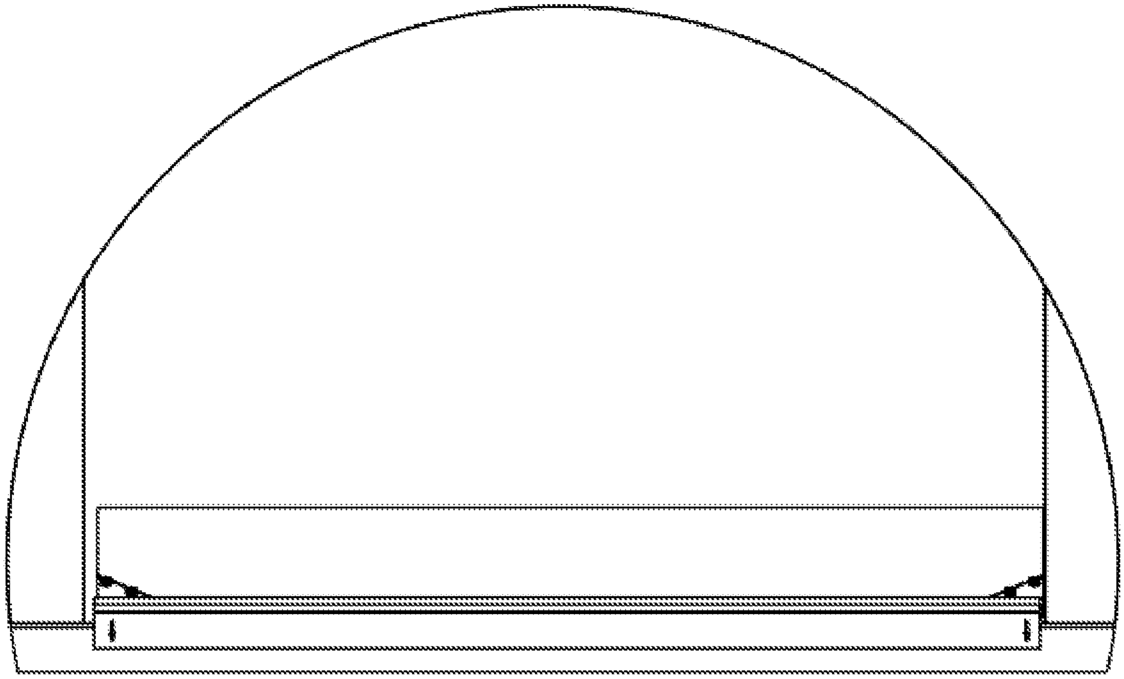
FIG. 14 shows a detail view of FIG. 13.

The main body 3 of the rain deflector 100 is preferably made of water- and weather-proof material that can withstand the harsh outdoor environments within which the invention is disclosed to operate. Materials, such as polypropylene, can be used for their material properties including high impact resistance and high strength to weight ratio. Other suitable materials include, but are not limited to, semi-pliable material like approximately 70 durometer rubber. In further embodiments, the rain deflector can be made of biodegradable materials. Preferably, the material for the main body 3 should present enough rigidity in height so as to not buckle under its own weight, but also offer flexibility along its length (especially in the mobile panel installation case as described below). The side views (FIGS. 5 and 6), show embodiments where the main body 3 has a cross sectional geometry such that it is thicker at a bottom portion, and then tapers to a thinner cross section towards the top, or upper portion. The thickness at the lower portion adds rigidity while the thinner upper portion provides pliability to follow a contoured surface and to deflect so as to provide a "seal" force. FIG. 5 illustrates the body 3 in a "straight" condition (dashed lines) before installation, and in a bent, or "sealing", condition after installation (solid lines).

In other embodiments, the main body 3, may be of a composite, or similar, material chosen such that the lower portion of the main body 3 has a first stiffness, and the upper portion of the main body 3 has a second stiffness.

The rain deflector 100 is removeably attachable to a sliding glass door via a one or more attach mechanism 8 that is disposed on the main body 3. These attach mechanisms 8 are preferably disposed in spaced relation on the back face distal to the top sealing surface, near the bottom edge. Each of the attach mechanism 8 may be mounted to the main body 3 at a fixed angle. In this way a fixed separation may be maintained between the sliding door glass surface and the bottom seal 1. In other embodiments, each of the one or more attach mechanism 8 may be mounted to the main body 3 via a mount that is configurable with an adjustable or hinged angle. In this way, the angle between the apparatus 100 and the sliding glass door is selectable by the user at the time of installation.

In embodiments, the attach mechanism 8 is a clamp. In other embodiments, the attach mechanism 8 includes an adhesive portion configured to adhere the attach mechanism to a sliding glass door panel or other suitable structure. In yet further embodiments, the attach mechanism 8 is a hinged plate configured to wedge into the track or adhere to the frame or other suitable structure.

As discussed above, and illustrated in FIG. 5, embodiments of the invention include one or more attach mechanisms 8 that are configured to impart a moment force M along the length of the main body 3, once installed.

Figure 15:
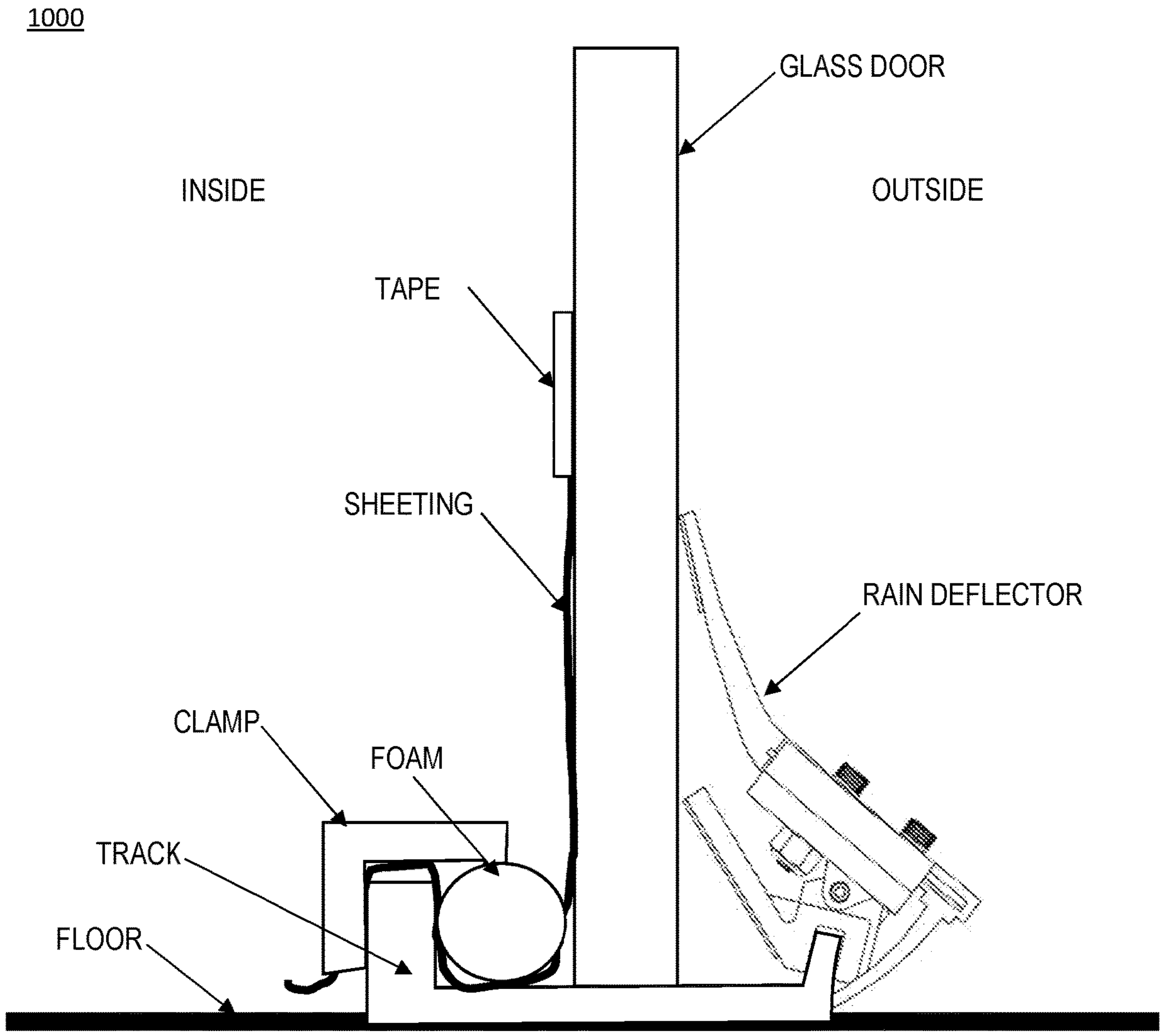
FIG. 15 shows a side view of a system according to an embodiment of the present invention.

The bottom edge of the rain deflector 100 includes a sealing portion 1 such that, once installed, a "seal" is created along the bottom edge of the main body 3, between the main body 3 and an adjacent surface (such as a floor, surface, or track see, for example, FIG. 15). In embodiments, the bottom seal includes a compliant structure such as, but not limited to, a bulb seal, a wiper seal, or a blade seal. In embodiments, the bottom seal may also be an adhesive.

The top edge of the rain deflector 100 includes a top sealing surface 5 such that, once installed, a "seal" is created along the top edge of the main body 3, between the main body 3 and an adjacent surface (such as a glass door, window, or similar surface). In embodiments, the top sealing surface 5 includes a compliant structure such as, but not limited to, a bulb seal, a wiper seal, or a blade seal. In embodiments, the top sealing surface 5 may also be an adhesive.

Embodiments of the present invention include a system 1000 comprising multiple rain deflectors as shown in FIGS. 9-15. For example, in an installation having a two-panel sliding glass door, one glass panel is static and the other is mobile (in sliding relation to the static panel). A system according to the present invention comprises a one or more rain deflector apparatus, each one rain deflector apparatus installed outside relative to each at least one static glass panel and each at least one mobile glass panel, whereby, the system is effective to substantially divert rain from traversing from the outside to the inside of the sliding glass door panels.

Referring now to FIG. 15, a simplified representation of the system 1000 is shown where the rain deflector 100 is installed outside the sliding glass door and a one or more secondary water mitigation component is installed inside the sliding glass doors. The one or more secondary water mitigation components may be chosen from the group consisting essentially of: sheeting, tape, foam, and clamps.

In an exemplary embodiment, the system 1000 includes a rain deflector 100 apparatus per each sliding glass door panel. The rain deflector 100 is attached by securing the attach mechanism 8 to a suitable structure on the outside of the corresponding sliding glass door panel. For example, if there is exposed track, the attach mechanism may be a clamp with a clip, thumb screw, or other fixing mechanism such that the attach mechanism securely attaches to the track. In other installations, the attach mechanism 8 may be a flat plate that wedges between the door and door track. In yet further installation scenarios, the attach mechanism may include an adhesive in order to secure the apparatus to a suitable structure (such as, but not limited to, the glass of the door, an exposed area of track, or an adjacent floor surface).

Once secured by the attach mechanism 8, the rain deflector 100 is pressed against the sliding glass door and the floor (or other surface) adjacent to the door. The "seal" interface at the top and bottom may be accomplished by a deflection force imparted by the flexing of the main body 3. Alternatively, the "seal" may be accomplished by a compliant seal, such as bot not limited to, a bulb seal, a wiper seal, or a blade seal. In other embodiments, an adhesive may be applied as the "sealing surface" between the rain deflector and the adjacent surface.

On the inside, additional rain mitigation components may be employed, singly or in combination. Although any one or combination of components may be employed, in a most complete embodiment (illustrated in FIG. 15), the interior rain mitigation components would include plastic (or similar) sheeting that would be taped to the glass and draped over the interior portion of the track. A length of compliant foam would be pressed into the track, capturing the sheeting between the track and the foam, so as to seal the sheeting down into the track grooves. A one or more clamp would be employed to secure the foam in the track.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the disclosure. In particular, features from one embodiment can be used with another embodiment. The embodiments were chosen and described to best explain the principles of the disclosure and the practical application, and to enable others of ordinary skill in the art to understand the invention for various embodiments with various modifications as are suited to the particular use contemplated.

The invention claimed is:

1. A rain deflector apparatus comprising:

a main body that is a substantially flat sheet having a front face, a back face, and a thickness defining a top edge, a bottom edge, a right edge, and a left edge;

a bottom seal extending from the bottom edge, spanning substantially from the right edge to the left edge;

a top sealing surface disposed adjacent to the top edge, spanning substantially from the right edge to the left edge; and at least one clamp attached to the main body distal to the top sealing surface, near the bottom edge.

2. The rain deflector of claim 1 where the clamp is pivotably mounted to the main body.

3. The rain deflector of claim 1 where the top sealing surface further comprises an adhesive.

4. The rain deflector of claim 1 where the bottom seal is a wiper seal.

5. The rain deflector of claim 1 where the bottom seal is a bulb seal.

6. The rain deflector of claim 1 further comprising an adhesive portion configured to adhere the rain deflector to a sliding glass door panel.

7. The rain deflector of claim 1 further comprising a hinged plate configured to wedge into a track or adhere to a frame.

8. The rain deflector of claim 1 made of weather-resistant materials.

9. The rain deflector of claim 1 made of biodegradable materials.

10. The rain deflector of claim 1 where the clamp is configured to impart a moment force along a length of the main body once installed.

11. The rain deflector of claim 1 where the main body further comprises a lower portion with a first thickness and an upper portion with a second thickness.

12. The rain deflector of claim 1 where the main body further comprises a lower portion with a first stiffness and an upper portion with a second stiffness.

13. A system for diverting rain from sliding glass panels having at least one static glass panel and at least one mobile glass panel riding within a track and defining an inside and an outside, the system comprising:

a one or more rain deflector apparatus, each one rain deflector apparatus installed outside relative to each at least one static glass panel and each at least one mobile glass panel, each one of the rain deflector apparatus comprising:

a main body that is a substantially flat sheet having a front face, a back face, and a thickness defining a top edge, a bottom edge, a right edge, and a left edge;

a bottom seal extending from the bottom edge, spanning substantially from the right edge to the left edge;

a top sealing surface disposed adjacent to the top edge, spanning substantially from the right edge to the left edge; and at least one clamp attached to the main body distal to the top sealing surface, near the bottom edge;

whereby, the system is effective to substantially divert rain from traversing from the outside to the inside of the sliding glass door panels.

14. The system of claim 13 further comprising a compliant barrier configured to be disposed within the track on the inside of the sliding glass panels.

15. The system of claim 13 further comprising a sheeting disposed on the inside of the sliding glass panels, constrained between a compliant barrier and the track.

16. The system of claim 14 further comprising a one or more clamp configured to constrain the compliant barrier substantially within the track.

17. The system of claim 13 where each rain deflector apparatus, once installed, is configured to exert a floor sealing force on an adjacent floor surface and a glass sealing force on an adjacent glass surface.

* * * * *